Feb. 1, 1944.　　　　M. ALDEN　　　　2,340,360
MACHINE AND METHOD FOR ASSEMBLING ELECTRIC WIRE TERMINALS
Filed Sept. 14, 1940　　　5 Sheets-Sheet 1
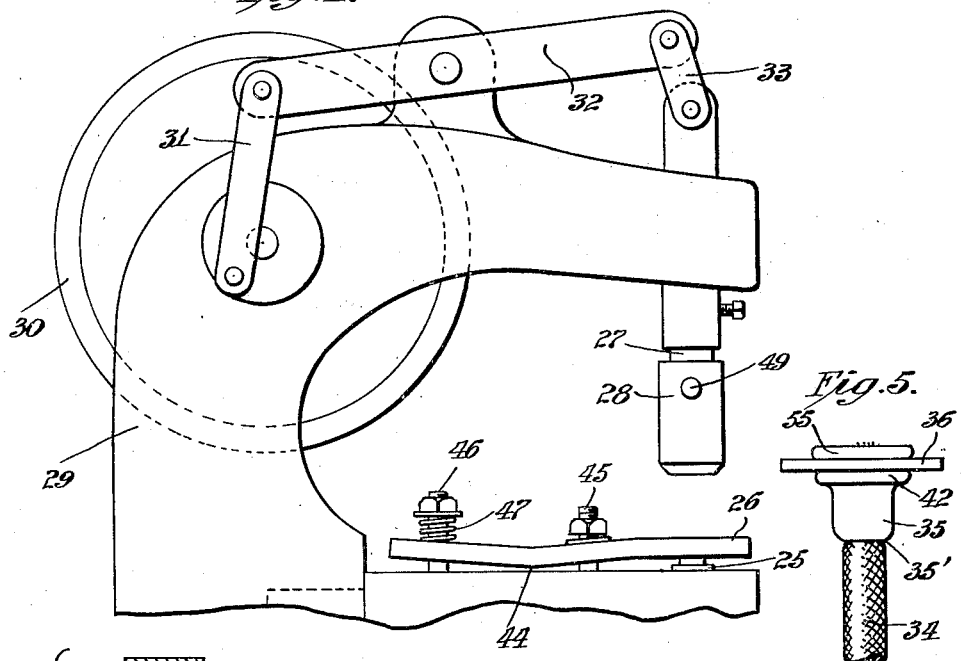
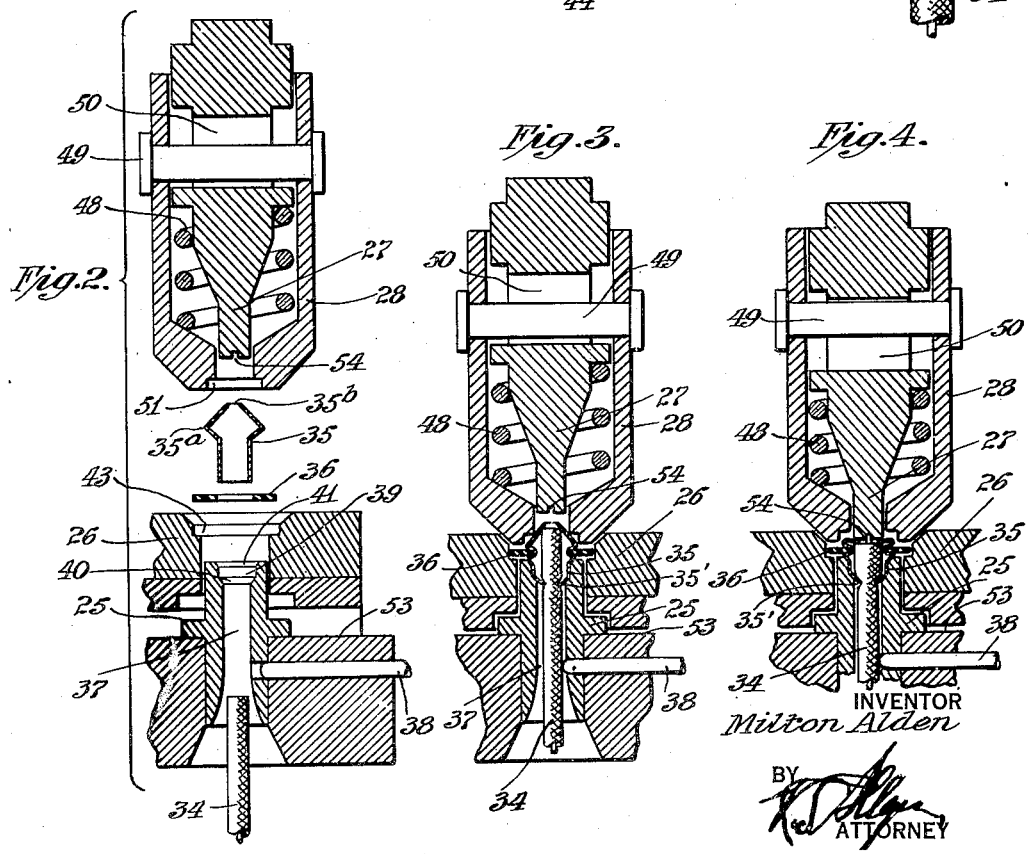
INVENTOR
Milton Alden
BY
ATTORNEY Feb. 1, 1944. M. ALDEN 2,340,360
MACHINE AND METHOD FOR ASSEMBLING ELECTRIC WIRE TERMINALS
Filed Sept. 14, 1940 5 Sheets-Sheet 2
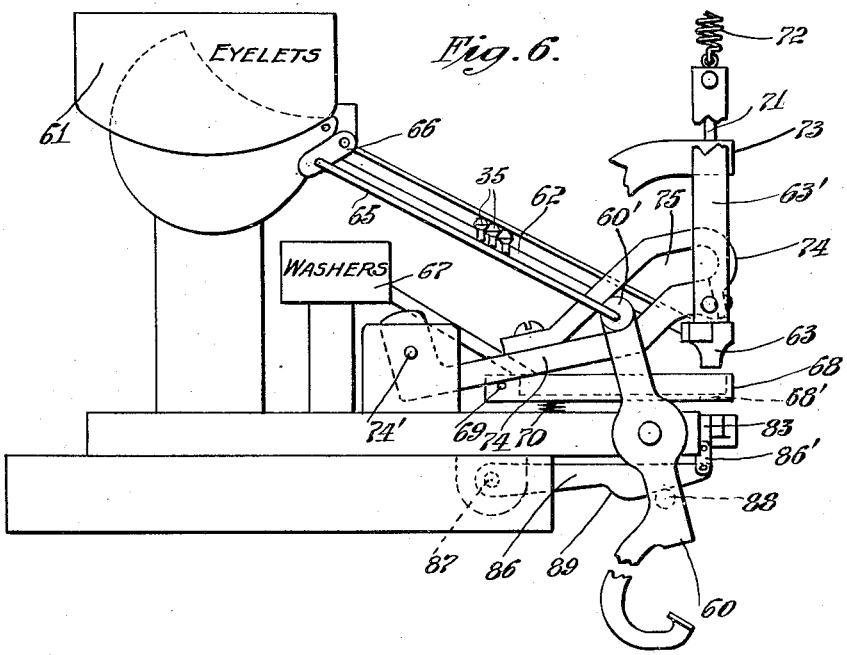
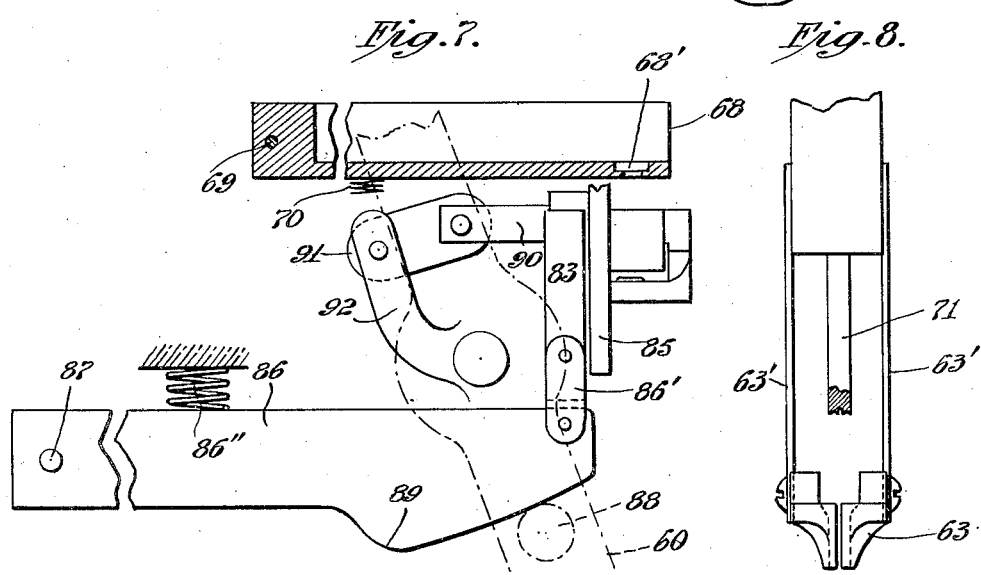
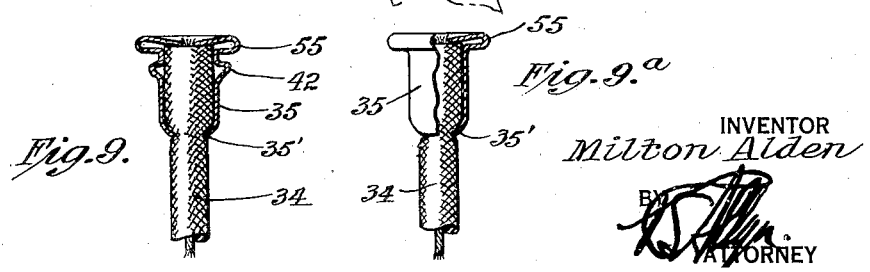
INVENTOR
Milton Alden
BY
ATTORNEY

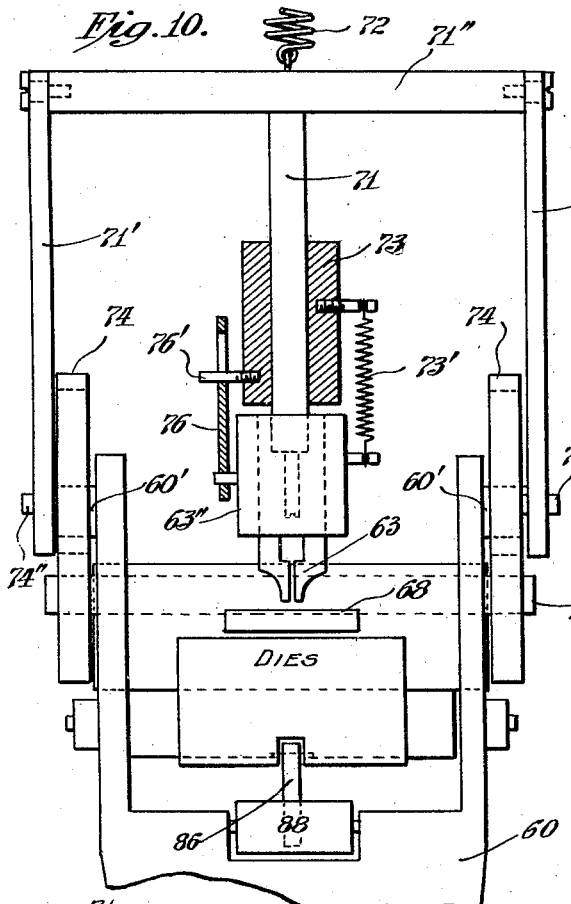
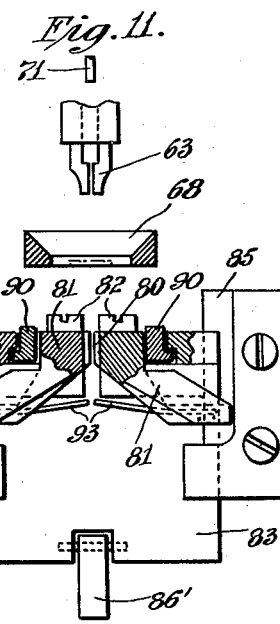
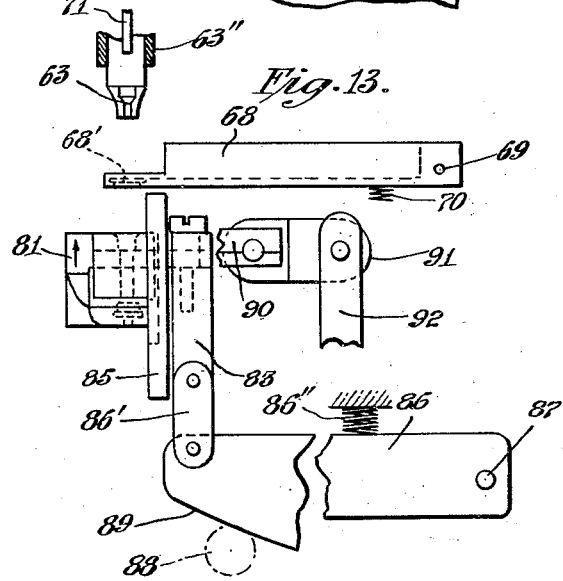
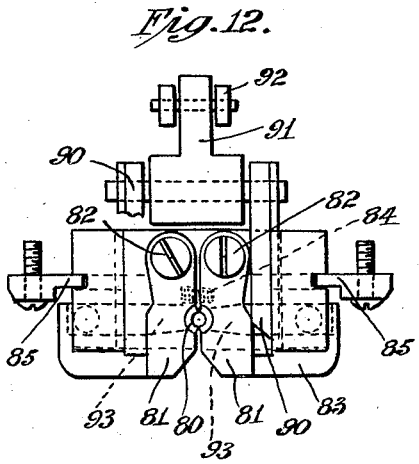

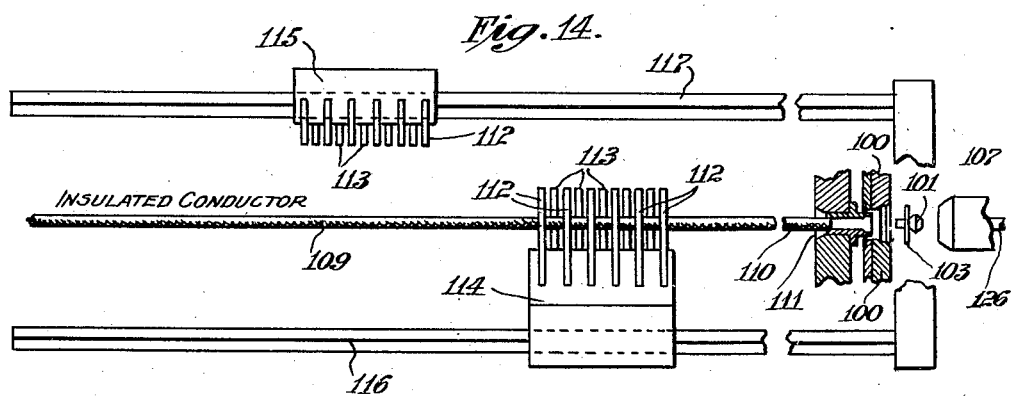
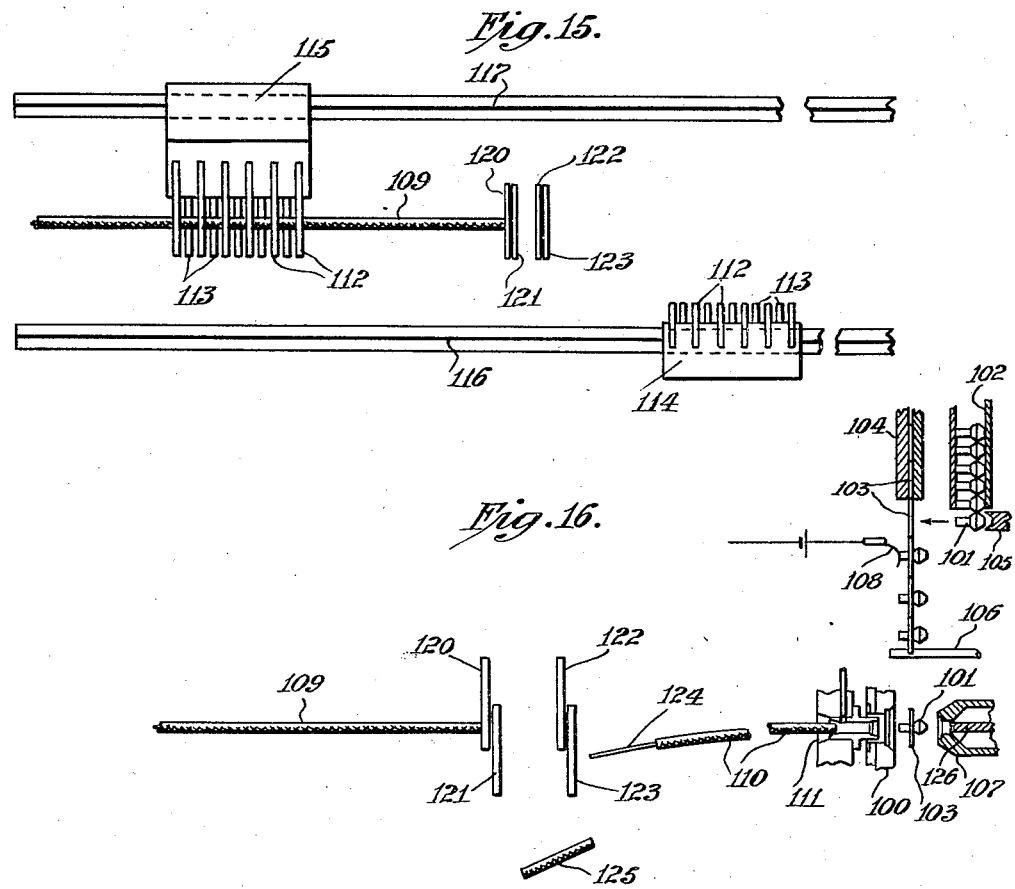

Feb. 1, 1944.   M. ALDEN   2,340,360
MACHINE AND METHOD FOR ASSEMBLING ELECTRIC WIRE TERMINALS
Filed Sept. 14, 1940   5 Sheets-Sheet 5
Fig. 17.
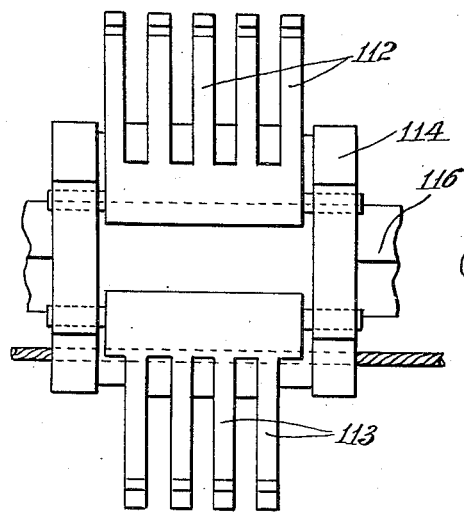
Fig. 18.
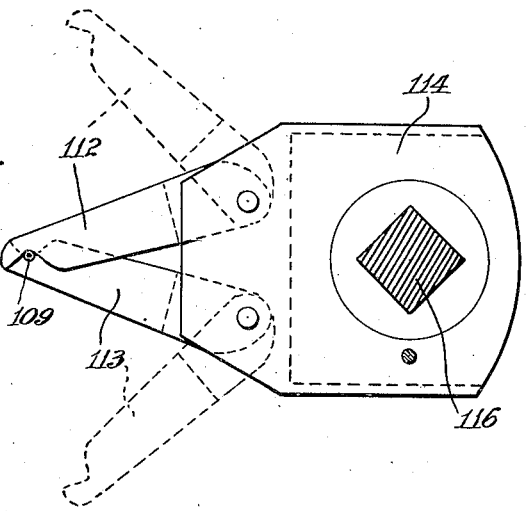
Fig. 20.  Fig. 19.  Fig. 21.
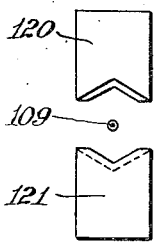
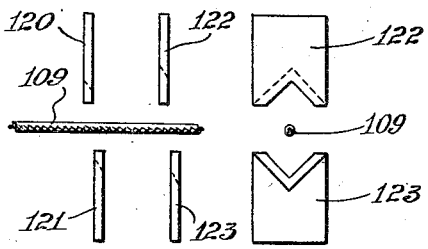
INVENTOR
Milton Alden
BY
ATTORNEY Patented Feb. 1, 1944

2,340,360

UNITED STATES PATENT OFFICE 2,340,360

MACHINE AND METHOD FOR ASSEMBLING ELECTRIC WIRE TERMINALS

Milton Alden, Brockton, Mass.

Application September 14, 1940, Serial No. 356,783

23 Claims. (Cl. 29—33)

My invention relates to machines and method for attaching terminal members or metallic tips to insulated electrical conductors. These wires are usually stranded and provided with rubber or textile coverings. The terminals are used as contacts or connectors and must therefore be electrically connected to the bare wire and securely attached mechanically not only to the bare wire but to the covering. Such devices are largely used in radio sets for circuit connectors which may be permanent or temporary, and in small lamp sockets.

For this purpose I provide a tubular tip member just large enough to fit over the insulation and having a head preferably of conical form with a small hole in the tapered end to receive the bare end of the wire. The head is compressed to grip the end of the wire and the opposite end is crimped into the insulation. Intermediate portions are upset to form flanges spaced from each other. A washer or a supporting strip may be attached in the groove between these flanges. The washers and tips may be fed automatically or by hand to the dies which do the forming. The wire can be automatically cut off, stripped at its end and fed to the dies.

There are several ways in which all or part of these operations may be performed as will be seen from the following specification and the accompanying drawings.

The contacts for small lamp sockets sometimes called "dial lights" will usually have insulating washers attached to the terminal eyelets or tips. Terminals for radio connections sometimes do not require the washers—or the finished eyeleted terminals may be mounted upon other suitable supports. My invention broadly is adapted to the attachment of terminals to insulated conductors either with or without the washers.

Fig. 1 is a side view on a reduced scale of one form of machine for assembling a terminal upon an insulated conductor according to my invention, the punch member being retracted. This arrangement is intended for operation by automatic power.

Fig. 2 is a vertical sectional view of the punch and die members separated and showing a tip or terminal eyelet and washer about to be inserted into the die members.

Fig. 3 is a similar sectional view but showing the parts at the beginning of the upsetting action.

Fig. 4 is similar to Fig. 3 but showing the parts at the last stage of assembly.

Fig. 5 is a detail side view on a larger scale of a completed terminal.

Fig. 6 is a side view of a second form of machine of my invention intended for operation by a treadle or leg action and showing hoppers for supplying the washers and eyelets.

Fig. 7 is a side view and partial section of portions of the machine of Fig. 6 but on a larger scale.

Fig. 8 is a front view of the punch number.

Fig. 9 is an enlarged sectional view of an insulated conductor and terminal without the insulating washer of Fig. 5.

Fig. 9a is a detail view of a modified form of terminal with only one flange.

Fig. 10 is a front view of the principal parts of the machine of Figs. 6 to 8 with the punch in the inactive or raised position.

Fig. 11 is a front view and partial section of the punch and die members of Fig. 10.

Fig. 12 is a plan view of the die members of Fig. 11.

Fig. 13 is a side view of parts shown in Fig. 7 viewed from the opposite side.

Fig. 14 is a plan view of parts of a third form of machine of my invention in which the wire is fed from a reel, cut off to suitable lengths which are automatically fed to the punch and die devices similar to those previously shown.

Fig. 15 is a plan view showing the feeding devices of Fig. 14 in another position.

Fig. 16 is a side view largely diagrammatic showing the cutting off of a predetermined length of conductor and the supply of eyelets and washers to be attached.

Fig. 17 is a side view of the feed grippers of the machine of Figs. 14 to 16.

Fig. 18 is an end view of the grippers of Fig. 17.

Fig. 19 is a detail edge view of the wire cutters and strippers of Fig. 16.

Fig. 20 is a detail side view of the wire cutters of Fig. 19.

Fig. 21 is a detail side view of the insulation cutters of Fig. 19.

In the form of machine shown on Sheet 1 of the drawings the die members 25 and 26 and the punch members 27 and 28 are carried by a frame 29. The punch members are driven by a motor or belt-driven wheel 30 through link 31, lever 32 and link 33.

The insulated wire or conductor 34 has attached to it by the action of the machine an eyelet or tip 35 of tubular form and a washer 36.

The die member 25 has a vertical passage 37 of a size to permit insertion of the conductor 34 up into the eyelet which has been dropped into the upper end of die member 25. A laterally applied plunger 38 may be provided, if desired, and actuated in any suitable manner to grip the side of the conductor and prevent it from slipping back in the die passage. The upper face of the die 25 has a cylindrical portion 39 to receive the shank of the eyelet and an inclined shoulder 40 against which the lower end of the eyelet is thrust (by punch action to be described) so as to turn-in or indent the edge 35' of the eyelet into the insulation of the conductor and thus grip the conductor and hold it securely. Above the cylindrical portion of the passage the edge of the die 25 flares outwardly somewhat so as to form the flange or bulged part 42 of the finished terminal.

The die member 26 has a pocket 43 to receive the washer 36. This die member 26 has a pivoted point or rocker support 44, two guide posts 45 and 46 and a spring 47 tending to lift the front end of the die 26.

The punch member 27 is carried directly by the link 33 and the other punch member 28 is pressed downwardly with respect to the member 27 by a spring 48, the extent of relative movement being limited by the pin 49 in the slot 50. The lower end of punch member 28 has a recess 51 shaped to engage the conically flared upper face 35a of the eyelet and force the eyelet into the die members and expand it to fit the washer and the die recesses. When the punch member 28 engages the die member 26 it forces the front end of 26 downwardly against the resistance of the spring 47 until the die member 26 or the washer 36 bottoms on some stationary part such as the shoulder 53 or the upper end of die member 25. When that occurs the punch member 27 continues downward against the pressure of spring 48 and its lower face 54 engages the upper end 35b of the eyelet which is perforated and thus upsets the eyelet and forces back the insulation on the upper end of the wire so that the bare tip projects up through the perforated end which is flattened out to form a flange 55 as shown in Figs. 4 and 5. The punch face 54 is recessed to allow for the end of the bare wire. This operation not only secures the tip to the wire effectively but does it in such a way that it is not necessary to pre-strip the end of the wire. This upsetting action of the dies may result in expanding the upper end of the insulation within the eyelet so as to afford additional security. The flattening of the top of the eyelet and crushing it on and against the bare wire reduces the size of the hole 35b and thus grips the bare end of the wire and provides an excellent mechanical and electrical connection. Of course, solder may be added if desired.

When the punch members are withdrawn the spring 47 presses down the rear end and lifts the front end of the die 26 so as to pull the eyelet and attached wire upwards out of the die member 25 and thus facilitate removal.

In case the washer 36 is not desired it may be removed or a split die member of the same general shape may be employed if desired so as to produce a grooved terminal (without a washer) as shown in Fig. 9.

In case it is desired to withdraw the finished wire and attached terminal laterally (instead of through the die members) it is obvious that the die members might be laterally split or divided as hereinafter shown in the dies of Figs. 11 and 12. It will be understood, of course, that the eyelets (and washers when used) may be fed to the machine in any suitable manner.

The eyelets and washers may, of course, be made of various shapes and sizes and the shape of the punch and die faces may be so formed as to produce various proportions and forms of flanges and grooves on or in the metallic tip. It is quite important, however, that the lower end of the eyelet or tip be turned or formed inwardly so as to grip the insulation of the wire and that the upper face of the eyelet be perforated so as to receive and grip the tip of the bare wire.

The form of machine illustrated in Figs. 6 to 13 is adapted to be actuated from a lever 60 by a treadle or leg action. Eyelets are fed from a hopper 61 and chute 62 to the holder 63 and the chute is kept filled by the action of the link 65 and lever 66 as is common in hopper fed devices.

The washers are fed from a hopper 67 to the tray 68 which is pivoted at 69 and sustained normally by a spring 70. Washers are slid by hand or otherwise into the pocket 68' in the bottom of the tray directly beneath the eyelet holder 63. The eyelets are forced downward through the holder passage by the plunger 71 into the washer 36.

The holder 63 has two jaws carried by springs 63' so that they can be forced apart by the action of the stamp plunger 71 when it pushes the eyelet through the holder. The stamp plunger is resiliently raised by spring 72 and guided in a stationary tubular bearing 73.

The arms 74 are hinged at 74' and have inclined grooves 75 for the rollers 60' carried by the actuating lever 60.

Each arm 74 is hinged at 74" to a link 71' which in turn is hinged to a cross bar 71" which carries the stamp plunger 71 so that when the arm 74 is swung down and up the stamp plunger will move down and up. The holder 63 has a sleeve 63" fixed to it and the sleeve in turn is connected to the fixed support 73 by a spring 73'. A slotted stop link 76 is connected at one end to the sleeve 63" and at the other end to the pin 76' projecting from the fixed support 73.

The die chamber 80 is formed in the adjacent faces of the parts 81, 81 which are hinged at 82, 82 to a carrier 83 and pressed apart by spring 84. Carrier 83 is guided in tracks 85 and connected by a link 86' to the front end of a lever 86 which is hinged at 87 so that the carrier can slide up and down. A spring 86" tends to depress lever 86.

The walls of the die chamber will be shaped so as to produce the desired form of terminal when the stamp plunger acts.

The carrier is raised by the roller 88 on lever 60 acting on the cam 89 of lever 86 when the lever 60 is rocked to the rear.

When the stamp 71 descends it strikes the upper end of the eyelet in the holder 63 and thus forces the holder and its sleeve 63" downward against the tension of the spring 73' until the lower end of the holder reaches the upper surface of the washer in the tray 68. The tray is thus depressed until the link 76 stops the downward movement of sleeve 63". As the stamp continues downwardly it forces the eyelet into the washer and forces both the eyelet and washer into the dies 81, 81.

The lower face of the stamp 71 will be shaped to give the proper form to the upper end of the eyelet and attach it to the bare tip of the conductor.

The die parts 81, 81 are forced together by the wedges 90 which are connected by a link 91 to an arm 92 of the treadle actuated mechanism so that the die parts are forced together at the beginning of the treadle action.

The dies are split or divided so as to permit the insertion of the wire from the front or laterally instead of requiring it to be fed in endwise. This is desirable especially when there is something attached to the lower end of the wire or if long wires are used and when high speed is desired. The wire is inserted when the die parts 81, 81 are separated and may be gripped by spring fingers 93. As the die parts or jaws rise, they meet the descending eyelet so that the wire or lead is pushed into the eyelet or center contact.

The parts are so designed that the distance of movement is such that the spring pressed jaws 93 at the bottom act as a compensator or automatic take-up if the lead is not placed exactly at the proper height. If it is too high the jaws move backward. It will be clearly seen from the foregoing that in this type of machine the split dies could be so shaped as to produce the effect of the washer in forming the terminal shown in Fig. 9 which has no washer.

Before attaching the terminal to the conductor the lever 60 will be held in the normal inoperative position with the dies 81, 81 separated or "open" and in the lower position as shown in the drawings. The holder 63, stamp 71 and tray 68 will be raised. An eyelet will be in the holder and a washer will be placed in the recess 68' in the tray. The conductor will then be inserted laterally between the dies at the proper height and against a stop if desired. The treadle will then be pushed or rocked backwardly so as to tilt the lever 60, and depress the holder 63 and stamp 71 so as to insert the eyelet into the washer in the tray recess 68'. The stamp or plunger 71 descends so as to force the eyelet and washer into the dies which at the same time are being forced together by the wedges 90, 90 and lifted by carrier 83. The plunger and dies coact to attach the eyelet and washer to the conductor in substantially the same manner as previously described with respect to the first form of machine.

When the treadle is released or returned to the normal position of rest, the stamp or plunger, the holder and the tray are raised, the carrier descends, the dies expand or open and the conductor with the terminal attached may be removed.

Obviously the washers (if used) could be fed automatically to the machine as will be seen in the third form to be described. Instead of treadle operation it will be understood that the machine could be actuated automatically or by power.

The machine of Figs. 14 et seq. may be entirely automatic. It combines automatic mechanism of any suitable character for cutting off a desired length of insulated wire (from a continuous coil), stripping insulation from one or both ends, if desired, feeding the prepared length to dies for receiving an eyelet and a washer and attaching the eyelet and washer to the end of the conductor substantially as described with respect to the two previously set forth machines.

In this case the dies 100 are split on a vertical plane and open and close by suitable horizontal action. The eyelets 101 are fed downwardly in a chute 102 and the washers 103 are fed downwardly in a chute 104. Just above the dies the eyelets are inserted into the washers intermittently by a plunger 105. At each cycle of the machine an assembled washer and eyelet is released by a slide 106 to fall into line with the die chamber into which it is then fed by the punch 107. As each eyelet is inserted into a washer or as each washer with an inserted eyelet passes a given point, it engages a contact 108 which closes an electric circuit (not shown). In case no eyelet is in a washer at this point, the circuit is broken and an alarm sounded or the machine stopped as may be desired so as to warn the operator that the machine has failed and needs attention.

Any suitable form of wire feeding and cut-off mechanism may be employed to handle the insulated conductor 109 and the predetermined cut-off lead 110 and insert it into the entrance 111 of the dies.

In the form shown the conductor is gripped alternately by the pairs of grippers 112 and 113 carried by slides 114 and 115 which are moved back and forth on guide rods 116 and 117 by any suitable means (not shown). These grippers are closed and opened alternately by any suitable well known means (not shown) to feed and release the conductor. For instance in Fig. 14 the grippers of slide 114 are holding the conductor and feeding a part of it toward the dies whereas the grippers of slide 115 are retracted. In Fig. 15 the action is the reverse, i. e., the 114 set of grippers are out of action but the 115 set are in action. The length of feed of the grippers along the tracks or guide rods 116 and 117 will be adjusted in any suitable manner so as to feed the predetermined length of conductor. When the grippers of slide 114 are feeding the conductor the other grippers of slide 115 are being retracted and vice versa—thus making the action substantially continuous. Of course a single set of grippers might be used but in that event there would be a loss of approximately one half the time of the machine while the grippers were being retracted.

The wire is cut off at the proper instant by a pair of knives 120 and 121. The insulation is cut (but not the wire) by a pair of knives 122 and 123. These pairs of knives are spaced apart longitudinally of the machine at such a distance as to leave the predetermined length of bare wire 124 when the lead 110 is drawn to the dies by the action of the feeding grippers. The sheath 125 is thus stripped from the wire by the holding action of the knives 122 and 123 which after cutting the insulation holds it while the lead is drawn out by the grippers.

When the lead is fed into the dies it is inserted into the eyelet which is positioned as above described and the punch 107 and the plunger 126 in conjunction with the dies complete the upsetting of the eyelet into the dies and the attachment to the insulation and to the tip of the bare wire as previously described. When the assembly is complete the punch members are retracted and the dies are separated horizontally so that the finished lead with eyelet and washer attached is allowed to fall into a collector or conveyor (not shown).

Although this machine is especially intended to attach washers to the terminals, it should be understood that many of the advantages of the invention may be attained by the mere attachment of a terminal eyelet as set forth without a washer.

Although these machines are adapted to automatically strip the insulation from the tip of the wire as the eyelet is upset, it should be understood that the insulation might be stripped from the tip of the wire previous to the insertion into the eyelet and still attain many of the advantages of my invention.

The shape of the eyelet and terminal may be modified without departing from the spirit or scope of my invention.

I claim:

1. In a wire terminal assembling machine, means for feeding a washer, means for feeding a tubular tip member into said washer, means for feeding an insulated wire into said tubular member and means for indenting one end of said tubular member upon the insulation of the wire and gripping the other end of the tubular tip member upon the bare tip of the wire.

2. In a wire terminal assembling machine, means for holding a washer, means for feeding a tubular tip member into said washer, means for holding an insulated wire in said tubular member and means for indenting a part of said tubular member into the insulation of the wire and means for gripping one end of the tubular tip member upon the bare tip of the wire.

3. A wire terminal assembling machine comprising a die for receiving an insulated wire and a tip, a spring pressed tray with a washer receiving pocket above the die, means for feeding a tubular tip into a washer held in the pocket, means for securing the tip upon the insulation and means for attaching the tip to the bare end of the wire.

4. In a wire terminal assembling machine, a die for receiving an insulated wire and a headed tubular tip on the insulation having an opening in the head for the bare tip of the wire, means for constricting a part of the tip between its ends and means for indenting one end of the tip on the insulation, upsetting the tip on opposite sides of the constricting means and gripping the bare end of the wire in the opening in the head.

5. In a wire terminal assembling machine, a die for receiving an insulated wire and a headed tubular tip having an opening in the head for the bare end of the wire, means for constricting a part of the tip between its ends and means for indenting one end of the tip into the insulation, means for upsetting the tip on opposite sides of the constricting means and means for gripping the bare end of the wire in the opening in the head.

6. A wire terminal assembling machine comprising a split die for receiving a tubular tip and a washer, means for holding the end of an insulated wire in the tubular tip, means for forcing the tip into the split die and attaching the tip to the washer and to the insulation, means for attaching the bare wire to the tip, and means for separating the parts of the die and disengaging the die from the tip and wire.

7. A wire terminal assembling machine comprising a die member, means for supplying washers, means for inserting tubular headed tip members into the washers, means for simultaneously securing a tip member to a washer and to the insulation of a wire within the tip member and means for securing the end of the bare wire to the tip member.

8. In a wire terminal assembling machine, a die having a recess for receiving a washer, said die having a passage for an insulated wire leading to said washer recess, a flange-forming recess adjacent the face of the washer and a tapered recess for receiving the end of a tubular tip member, a plunger having a flange-forming recess in its end in alinement with the wire passage for forcing the inner end of a tubular tip member into the tapered recess and indenting a part of said tip member into the insulation on a wire in said passage and means for upsetting said tubular member to engage opposite sides of said washer and attaching the bare tip of the wire to the tubular member.

9. In a wire terminal assembling machine, a die having a passage for an insulated wire, a flange-forming recess adjacent its face and a tapered recess for receiving the end of a tubular tip member, plunger means having a flange-forming recess in its end in alinement with the wire passage for forcing the inner end of a tubular tip member into the tapered recess and indenting said end into the insulation on a wire in said passage, said plunger means coacting with said die for upsetting portions of said tubular member to form flanges and gripping the bare tip of the wire in the outer end of the tubular member.

10. In a wire terminal assembling machine, means for applying one end of a tubular tip to the end of an insulated wire, said tip having a perforation in its other end, means for indenting a part of the tip into the insulation and means for forcing the perforated end of the tip against the end of the insulation around the end of the wire so as to strip the insulation from the wire and cause the bare end of the wire to protrude through the perforation and then crushing the end of the wire and the tip together.

11. The method of securing a tubular terminal tip having a hole in one end upon an insulated wire which comprises, contracting one end of the tip upon the insulation, upsetting the other end of the tip and stripping the insulation away from the end of the wire so as to allow the bare end of the wire to protrude through the hole in the end of the tip and crushing the end of the tip upon the bare wire.

12. The method of assembling a tubular metallic tip and an insulated wire conductor which comprises inserting an end of an insulated wire into a tubular tip having one end open to receive the insulated wire end and the other end having a smaller opening, contracting at least a part of the larger end into the insulation, upsetting the other end of the tip, forcing the insulation back inside of the tip and causing the bare end of the wire to extend through the smaller opening and securing the bare end of the wire therein.

13. The method of forming a terminal on an insulated wire, the end of which is exposed, which comprises inserting the end of the wire with its insulation through a washer, inserting one end of an eyelet through the washer and onto the insulation of the wire, upsetting the outer end of the eyelet upon the exposed end of the wire, indenting the other end of the eyelet into the insulation on the wire and expanding an intermediate portion of the eyelet within the washer.

14. In a machine for assembling an eyelet on an insulated wire, the end of the wire being exposed, a main die having a passage for the wire and a recess for receiving an end of an eyelet and directing part of its end into the insulation on the wire, an annular die movable axially of the main die for receiving a washer, a main punch member for forcing a perforated eyelet through a washer in said annular die and upsetting the eyelet in the main die and a second punch movable axially through the main punch for shaping the end of the eyelet and securing it to the exposed end of the wire.

15. In a machine for assembling an eyelet on the end of an insulated wire, a main die formed of two parts movable toward each other and having recesses for receiving the inner end of an eyelet and directing part of it into the insulation of the wire, means for feeding eyelets one at a time into said die, and a punch member having an outer part and a relatively movable inner part, the outer part being shaped to coact with the outer end of the eyelet to force the eyelet into the die and upset the eyelet and attach it to the insulation of the wire, the inner part being movable relative to the outer part to shape the outer end of the eyelet and strip the insulation from the wire and attach the eyelet to the bare wire.

16. In a wire terminal assembling machine, means for holding a washer, means for inserting an eyelet into said washer, said eyelet having a perforated end wall, means for attaching said washer and eyelet to the insulation of an insulated wire near the end thereof including means for contracting part of the eyelet into the insulation and means for collapsing the perforated part of the eyelet upon the end of the wire and forcing the wall of the perforation into engagement with the end of the wire.

17. In a wire terminal assembling machine, means for placing a tubular eyelet perforated at its outer end on the end of an insulated wire, the end of the wire being exposed, means for indenting the inner end of the eyelet into the insulation of the wire near its end, means for upsetting a portion of the eyelet between its ends to form two spaced flanges, and means for forcing the outer perforated end of the eyelet upon the exposed tip of the wire.

18. A pair of die members movable laterally relative to each other and having die recesses shaped to direct portions of the end of a tubular eyelet toward its axis when the eyelet is forced into the die members, said recesses also being provided with semi-annular seats, means for guiding the end of an insulated wire between the die members, means for supplying a tubular eyelet having a perforated end between said die members and a punch member cooperating with the die members for compressing said eyelet upon the end of the insulated wire, forcing the eyelet on to the bare end of the wire through the hole in the end of the eyelet and forming a flange upon a portion of the eyelet between its ends.

19. The method of forming a flanged wire terminal on the end of a piece of insulated wire which comprises assembling upon the end of a piece of insulated wire one end of a tubular eyelet having an enlarged head with an axial perforation in the other end, upsetting the enlarged head thereby forcing back the insulation at the wire end and forming spaced flanges around the insulation and at the same time crushing the perforated end of the eyelet into engagement with the bare tip of the wire.

20. In a wire terminal assembling machine, means including a punch for forcing a tubular tip member into a washer, means including die members for positioning the tip member and washer on the end of an insulated wire, said punch and die members having recesses and walls for permitting the tip member to expand and grip the washer and to force a part of the tip member to contract and grip the insulation and means for moving the punch member to force the tip member to expand in the die members and engage the washer and to force a part of the tip member to contract in the die members to grip the insulation.

21. In a machine for securing a tubular terminal and a washer to the end of a piece of insulated wire, the end of the wire being exposed, a pair of separable die members for centering and supporting a washer and a tubular eyelet in the washer and for guiding the end of an insulated wire in line with the space between the die members, means for moving the die members toward and from each other and punch mechanism cooperating with the die members for compressing an eyelet within said die members, forcing the end of the eyelet upon the exposed end of the wire, upsetting part of the eyelet within the die members to form a laterally projecting flange, and locking the washer on the eyelet and indenting part of the eyelet against the insulation of the wire, said die members having recesses to receive the flange formed by the upsetting of the eyelet.

22. In a machine for securing a tubular terminal on to the end of a piece of insulated wire, the end of the wire being exposed, a pair of separable die members for centering and supporting a tubular eyelet and for guiding the end of an insulated wire in line with the space between the die members, means for moving the die members toward and from each other and punch mechanism cooperating with the die members for compressing an eyelet within said die members, forcing the end of the eyelet upon the exposed end of the wire, upsetting part of the eyelet to form a laterally projecting flange on the eyelet and indenting part of the eyelet against the insulation of the wire, said die members having recesses to receive the flange formed by the upsetting of the eyelet.

23. The method of forming a flanged wire terminal on the end of a piece of insulated wire, the tip of which is bare and which comprises assembling upon the end of a piece of insulated wire one end of a tubular eyelet having an enlarged head with an axial perforation in one end, upsetting the enlarged head and forming spaced flanges around the insulation and at the same time crushing the perforated end of the eyelet into engagement with the bare tip of the wire.

MILTON ALDEN.